2,923,703

DIAZONIUM COMPOUNDS

Robert J. Bruni, Lynn, and Clarence Richard Morgan, Marblehead, Mass., assignors, by mesne assignments, to Kalvar Corporation, New Orleans, La., a corporation of Louisiana No Drawing. Application December 28, 1954
Serial No. 478,184

2 Claims. (Cl. 260—141)

The present invention relates to new diazonium compounds, to the preparation of such compounds, and to photographic materials containing them.

In one aspect of the present invention new stabilized diazonium compounds are prepared, namely, 1-dimethylamino-4-naphthalene diazonium salts,

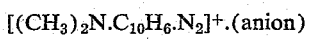

which are selected from the group of compounds having the general formula:

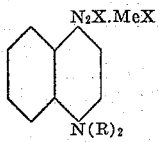

where R is an alkyl group, X is a halide and Me is a salt forming metal selected from the group consisting of zinc, boron, cadmium, tin and nickel.

The novel compounds according to this invention are characterized by being photolytic in the visible range of the light spectrum and having a sharp absorption peak within that range. Photolysis in these cases involves decomposition with release of nitrogen. Many diazonium salts have previously been described as decomposible by light with generation or release of nitrogen gas. However, such previously described diazonium salts are substantially sensitive only to wavelengths shorter than or at the very margin of the visible range of the spectrum. Utilization of such previously described salts for their photolytic properties has thus heretofore required special provisions such as quartz optics. The compounds of this invention, however, have sharp absorption peaks of decomposition in the visible violet to blue portion of the light spectrum and may be used with ordinary optical apparatus where it is desired to exploit their photo-sensitive properties. Moreover, this absorption range permits exposure with efficient and high energy sources emitting light of a wavelength which essentially coincides with the sensitivity range of the new compound, which results, in conjunction with the use, if desired, of highly transmissive optical glass, in an appreciable increase of photographic speed. On the other hand, due to its sensitivity range, manipulation of such material in incandescent or subdued daylight is harmless. Thus, in another aspect of the invention, the novel compound is especially useful in photographic material wherein it is combined with a vehicle wherein a dye record can be formed or which undergoes substantially purely textural changes upon photolytic generation of nitrogen under control of an optical image.

The compounds of this invention can be prepared by various methods but two methods are preferred.

In one method, a primary aromatic amine such as sulfanilic acid $NH_2.C_6H_4.SO_3H$, is reacted with sodium nitrite in the presence of hydrochloric acid to form the diazonium chloride, $SO_3H.C_6H_4.N_2Cl$. The cloride is coupled to the tertiary aromatic amine, N,N-dimethylnaphthylamine, $(CH_3)_2N.C_{10}H_7$, to form the diazo compound, $SO_3H.C_6H_4N_2.C_{10}H_6.N(CH_3)_2$. This diazo compound is then reduced with sodium hydrosulfite to give 4-dimethylamino-1-naphthylamine, $NH_2.C_{10}H_6.N(CH_3)_2$, dissolved in hydrochloric acid. This latter amine is then reacted with sodium nitrite in the presence of the desired acidic constituent to yield the diazonium salt.

In another method, a tertiary aromatic amine is reacted with hydrochloric acid and sodium nitrite to form a nitroso compound which is then reduced to the amine and reacted with sodium nitrite and hydrochloric acid to yield the diazonium chloride. Where other salts are desired the diazonium chloride is reacted with an excess of acidic constituent and then separated and purified.

Various diazonium salts can thus be formed, including the fluoborate, the zinc chloride double salt, the cadmium chloride double salt, and the sulfate.

The compounds of this invention can be dispersed in colloids such as proteins, gums, polymeric carbohydrates, natural and synthetic resins as a vehicle or matrix, whereby the gas generated by appropriate light, as above discussed, will yield a dye record or a disrupted structure related to the amount of effective light energy. The structural change of the vehicle defining a photographic record by way of irregular refraction and reflection of the light in which this record is observed.

A method for obtaining the compounds of this invention is illustrated in the following example.

EXAMPLE 1

*Synthesis of 1-dimethylamino-4-naphthalene diazonium fluoborate from dimethylaminonaphthalene and sulfanilic acid*

A solution was prepared by heating until complete solution 556 g. (3.2 moles) sulfanilic acid, 170 g. (1.6 moles) sodium carbonate, and 3200 ml. water. After cooling this solution to 15° C., a solution of 224 g. (3.24 moles) sodium nitrite in 640 ml. water was added and the resulting solution was added to a mixture of 320 ml. (3.7 moles) conc. hydrochloric acid and 3000 g. ice and allowed to stand for 15 minutes. The entire mixture containing the diazotized sulfanilic acid was then added to a solution of 547 g. (3.2 moles) N,N-dimethylnaphthylamine and 3200 ml. (58.7 moles) acetic acid. Coupling occurred immediately and the azo compound was precipitated by cooling. The product after filtering, washing with water, and drying weighed 910 g. (80%).

The 910 g. (2.55 moles) of the latter azo compound was suspended in a solution of 400 g. (10 moles) sodium hydroxide in 6000 ml. water and heated to 70° C. Sodium hydrosulfite (1000 g., 5.75 moles) was added in portions while maintaining the temperature of 70° C. Additional sodium hydroxide was added but no further separation of amine as black oil occurred. The amine was separated from the aqueous solution and was dissolved in ether which had been used to extract final amounts of amine from the aqueous layer. Sodium hydroxide pellets were used to dry the ether solution overnight. The solution was filtered, cooled to Dry Ice acetone temperature and anhydrous hydrogen chloride gas added to it until the solution tested acidic. The gray amine hydrochloride was filtered and spread on a large filter paper to air dry during which time it changed to a purple color. Titration of a sample of this solid with standard base indicated that it was the monohydrochloride. A yield of 435 g. (76.7%) was obtained (a 61.4% over-all yield to this point).

To a suspension of 435 g. (1.95 moles) of the latter amine hydrochloride in 975 ml. of 50% fluoboric acid, maintained at 5° C. was added a solution of 148 g. (2.15 moles) sodium nitrite in 300 ml. water. The crude diazo was filtered, washed with cold ethanol and then ether and, after drying, weighed 337 g. (60%, 36.8% over-all). The crude product was recrystallized first from a 23% acetonitrile-77% acetone mixture (18 ml. per gram) and then from acetone (50 ml. per gram). Each solution was given a charcoal treatment (.5 Darco per gram product) and ether was added to the boiling filtrates until a slight amount of permanent precipitate occurred and then cooled to ice temperature until crystallization was complete. A 42.3% recovery was obtained in the first recrystallization and a 47.8% recovery from the second, giving an 8% over-all yield.

The product of the above example was found to have a sintering point of 105° C., and a melting point of 123° C. at which temperature it decomposed. A sharp absorption peak of decomposition was found at 420 millimicrons, which is in the blue end of the visible spectrum. The formula of the compound was determined to be 1-N(CH$_3$)$_2$, 4-N$_2$.BF$_4$, C$_{10}$H$_6$, with combustion analysis giving the following results:

| | Percent |
|---|---|
| Carbon | 50.50 |
| Hydrogen | 4.40 |
| Nitrogen | 14.73 |

It was further found that the fluoborate was easy to incorporate and to distribute in a photographic vehicle such as gelatin or modified "Saran," and in fact appeared to be more readily distributed in Saran than previously described photolytic diazonium compounds.

The following examples present this photographic utilization of the new compounds for purposes of obtaining records in terms of purely textural, non-dye, modification of a vehicle.

EXAMPLE 2

*Gelatin coating with photolytic compound*

100 grams of high-grade dry gelatin such as is sold under the trade designation "Kodak Peabody Gelatin" is soaked for two hours in 1900 ml. of distilled water of 30° C. To this is added 8 grams of citric acid C.P. and 10 grams of 1-dimethylamino-4-naphthalenediazonium fluoborate as a sensitizer. This is then diluted to make 2000 ml. This emulsion is then coated on a support by conventional means to a thickness of about 2 mils to 0.6 mil rather less than more, depending upon process control details and record requirements. This material furnishes vehicle-textural records upon exposure to an original (for example by contact for about 5 seconds to a high pressure arc discharge lamp) at room temperature, and development by uniform heating to about 250° F. for a few seconds.

EXAMPLE 3

*Synthetic coating with photolytic compound*

Certain synthetic thermoplastic vehicle materials suitable for use with the disclosed diazonium compounds are immediately available and these include polystyrene, polyvinyl chloride, copolymers of vinyl chloride and vinyl acetate. Such materials available directly for use as vehicles are however not very abundant and often have undesirable physical properties. Such vehicle materials which are not directly suitable for optimum results can be rendered so suitable by using auxiliary admixtures or modifiers of which this example is illustrative.

Dissolve, in 23 cc. methyl ethyl ketone, 10 g. of the vinyl type resin made by and available from the Dow Chemical Company under the trade name "Saran F-120," described as a copolymer of vinylidene chloride and acrylonitrile, and add 1 g. of the diazonium salt according to the present invention dissolved in 7 cc. acetonitrile which solution is then diluted with 3 cc. of methyl ethyl ketone and slowly added while stirring to the above solution of "Saran." This emulsion is coated on a suitable supporting sheet material preferably the polyester film material described in Patent No. 2,465,319 of March 22, 1949, and marketed by E. I. du Pont de Nemours & Co., Wilmington, Delaware, under the trade name "Mylar," which sheet material was discovered to be especially suitable for techniques utilizing photolytically generated gas to obtain vehicle-texture records.

We claim:
1. A diazonium compound having the following general formula:

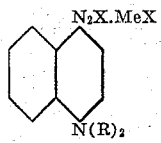

where R is a lower alkyl group, X is a halide and Me is boron.

2. As a composition of matter, 1-dimethylamino-4-naphthalene diazonium fluoborate.

References Cited in the file of this patent

UNITED STATES PATENTS

| | | |
|---|---|---|
| 1,840,333 | Schmidt | Jan. 12, 1932 |
| 2,138,559 | Straub et al. | Nov. 29, 1938 |
| 2,193,998 | Zwilgmeyer | Mar. 19, 1940 |
| 2,699,392 | Herrick et al. | Jan. 11, 1955 |
| 2,703,756 | Herrick et al. | Mar. 8, 1955 |